United States Patent [19]

Blackburn et al.

[11] Patent Number: 5,351,527
[45] Date of Patent: Oct. 4, 1994

[54] METHOD AND APPARATUS FOR TESTING FLUID PRESSURE IN A SEALED VESSEL

[75] Inventors: Brian K. Blackburn, Rochester; Scott B. Gentry, Romeo; Joseph F. Mazur, Washington, all of Mich.

[73] Assignee: TRW Vehicle Safety Systems Inc., Lyndhurst, Ohio

[21] Appl. No.: 986,035

[22] Filed: Dec. 4, 1992

[51] Int. Cl.$^5$ .................. G01M 3/00; B60R 21/26; B60R 21/16

[52] U.S. Cl. .......................... 73/52; 280/736; 280/728 R

[58] Field of Search ............... 73/52, 702, 706, 749, 73/49.3, 579; 280/735, 736, 737, 741, 728 R

[56] References Cited

U.S. PATENT DOCUMENTS

| | | | |
|---|---|---|---|
| 3,290,922 | 12/1966 | Thompson | 73/52 |
| 3,435,664 | 4/1969 | Harris | 73/54 |
| 3,438,493 | 4/1969 | Goble | 209/111.9 |
| 3,608,715 | 9/1971 | Snyder et al. | 73/52 |
| 3,691,521 | 9/1972 | Schaefer | 340/52 R |
| 3,745,384 | 7/1973 | Blanchard | 310/8.2 |
| 3,771,121 | 11/1973 | Lohr | 340/52 B |
| 3,774,150 | 11/1973 | Matsui | 340/60 |
| 3,781,788 | 12/1973 | Schiesterl et al. | 280/728 R |
| 3,802,252 | 4/1974 | Hayward et al. | 73/52 |
| 3,810,655 | 5/1974 | Pracher | 280/736 |
| 3,942,381 | 3/1976 | Brown et al. | 73/392 A |
| 4,049,935 | 9/1977 | Gruber | 200/83 P |
| 4,187,718 | 2/1980 | Shibasaki | 73/52 |
| 4,212,205 | 7/1980 | West et al. | 73/579 |
| 4,399,514 | 8/1983 | Hamasaki et al. | 364/558 |
| 4,406,157 | 9/1983 | Miyahara et al. | 73/52 |
| 4,869,097 | 9/1989 | Tittmann et al. | 73/52 |
| 5,060,974 | 10/1991 | Hamilton et al. | 280/736 |

*Primary Examiner*—Richard E. Chilcot, Jr.
*Assistant Examiner*—William L. Oen
*Attorney, Agent, or Firm*—Tarolli, Sundheim & Covell

[57] ABSTRACT

An apparatus (20) for sensing pressure in a stiff wall sealed vessel (30) comprises a speaker (60) operatively coupled to the vessel (30) for, when energized, transferring energy to pressurized fluid in the vessel (30). The energy transferred from the speaker (60) establishes oscillations of the pressurized fluid in the vessel (30). A piezoelectric capacitive sensor (62) is operatively coupled to the vessel (30) for providing a received electrical signal having a frequency value indicative of the oscillation frequency of the pressurized fluid in the vessel (30). A receiver circuit (70, 90, 110) is operatively connected to the capacitive sensor (62) and provides a fluid resonating signal having a frequency indicative of the natural frequency of the oscillating pressurized fluid in the vessel (30). The natural frequency of the pressurized fluid is indicative of the fluid pressure in the vessel (30). A drive circuit (120, 164) is operatively connected to the receiver circuit (70, 90, 110) and to the speaker (60). The drive circuit (120, 164) initially drives the speaker (60) with a square wave pulse and subsequently drives the speaker (60) with an energy wave having a frequency equal to the natural frequency of the pressurized fluid in the vessel (30) so as to lock onto the natural frequency.

30 Claims, 3 Drawing Sheets

METHOD AND APPARATUS FOR TESTING FLUID PRESSURE IN A SEALED VESSEL

TECHNICAL FIELD

The present invention is directed to diagnostic testing of an occupant restraint system and is particularly directed to a method and apparatus for testing the fluid pressure in a sealed vessel from which pressurized fluid is used to fill an air bag of an occupant restraint system upon the occurrence of a vehicle crash condition.

BACKGROUND OF THE INVENTION

Vehicle occupant restraint systems having an actuatable restraining device are well known in the art. One particular type of actuatable restraining device includes an inflatable air bag mounted to inflate within the occupant compartment of the vehicle. The air bag has an associated, electrically actuatable ignitor, referred to as a squib.

Such occupant restraint systems further include a crash sensor for sensing the occurrence of a vehicle crash condition and for providing an electrical signal indicative of the crash condition. When the crash sensor indicates that the vehicle is in a crash condition, an electric current of sufficient magnitude and duration is passed through the squib for the purpose of igniting the squib. The squib, when ignited, ignites a combustible gas generating composition and/or pierces a vessel of pressurized gas operatively coupled to the air bag, which results in inflation of the air bag.

Pressurized gas vessels for use in occupant restraint systems are pressurized to approximately 2000-3000 PSI. Proper inflation of the air bag upon the occurrence of a vehicle crash condition is dependent on the pressurized vessel being at the proper pressure. Since the pressurized vessel will be installed in the vehicle at the time of manufacture and several years may pass prior to that vehicle being involved in a crash condition, even a small leak in the vessel may leave the vessel with insufficient pressure to inflate the air bag properly during its deployment. It is desirable to provide a diagnostic test arrangement that monitors the fluid pressure in the vessel and warns the vehicle operator when the pressure in the vessel falls below a predetermined minimum value necessary for proper inflation of the air bag.

A pressurized vessel of an air bag restraint system has a normally sealed air bag opening which is pierced upon firing of the squib and through which fluid flows to the air bag. Several different methods and apparatus have been proposed to measure the pressure within the air bag pressure vessel and to warn the vehicle operator if the pressure falls below a predetermined value. These arrangements typically require that a pressure sensing device have access to the interior of the vessel through an associated test opening in the vessel. The test opening in the vessel is separate from the pierceable sealed air bag opening. If a pressurized vessel leaks, the location of such a leak is most probably at a sealed opening in the vessel. Such leaks may develop simply due to a failure of the seal. Therefore, the more openings that are present in the vessel, the greater the probability that a leak will develop. It is desirable to provide a pressure sensing method and apparatus that does not require an associated opening in the vessel, thereby avoiding an additional potential leak path of pressurized gas from the vessel.

SUMMARY OF THE INVENTION

The present invention provides a method and apparatus for measuring the fluid pressure in a sealed vessel. The invention has particular application for diagnostic testing of a pressurized fluid vessel of an air bag restraint system. In accordance with the invention, a transducer adjacent the vessel outputs an initial square wave pulse to the vessel, a receiver monitors the fluid vibrations, a monitoring circuit monitors for the natural frequency of the fluid and subsequently drives the transducer at the natural frequency of the fluid.

In accordance with one aspect of the present invention, an apparatus is provided for sensing pressure in a sealed vessel. The apparatus comprises transducer means operatively coupled to the vessel for, when energized, transferring energy to pressurized fluid in the vessel. The energy transferred establishes oscillations of the pressurized fluid in the vessel. Receiver means is operatively coupled to the vessel for providing a received electrical signal having a frequency value indicative of the oscillation frequency of the pressurized fluid in the vessel. Receiver circuit means is operatively connected to the receiver means for providing a fluid resonating signal having a frequency indicative of the natural frequency of the oscillating pressurized fluid in the vessel. The natural frequency is indicative of the fluid pressure in the vessel. The apparatus further includes drive circuit means operatively connected to the receiver circuit means and to the transducer means for initially driving the transducer means with a square wave energy signal. Subsequently, the drive circuit means drives the transducer means with an energy wave having a frequency equal to the natural frequency of the pressurized fluid in the vessel.

In accordance with another aspect of the present invention, a method is provided for sensing pressure in a sealed vessel. The method comprises the step of transferring energy to pressurized fluid in the vessel. The energy establishes oscillations of the pressurized fluid in the vessel. The method also includes the step of receiving a signal from the vessel having a frequency value indicative of the oscillating frequency of the pressurized fluid in the vessel resulting from the transferred energy including the natural frequency of the fluid. Another step of the method is providing a fluid resonating signal having a frequency equal to the natural frequency of the oscillating pressurized fluid in the vessel. The natural frequency is indicative of the fluid pressure in the vessel. The method further includes initially transferring a square wave energy signal to the vessel, and subsequently transferring an oscillating energy wave to the vessel having a frequency equal to the natural frequency of the pressurized fluid in the vessel.

In accordance with yet another aspect of the present invention, an air bag diagnostic apparatus is provided for use in an air bag restraint system. The air bag restraint system includes a crash sensor connected to a controller for providing a signal upon the occurrence of a vehicle crash condition. The restraint system also includes a pressurized fluid bottle, a squib connected to the fluid bottle and electrically connected to the controller, and an air bag connected to the fluid bottle. The controller actuates the squib upon the occurrence of a crash condition to pierce a seal on the fluid bottle and let the pressurized fluid in the bottle inflate the air bag. The air bag diagnostic apparatus comprises transducer means operatively coupled to said fluid bottle for, when energize, transferring energy to pressurized fluid in the fluid bottle. The transferred energy establishes oscillations of the pressurized fluid in the fluid bottle. Receiver means is operatively coupled to the fluid bottle for providing a received electrical signal having a frequency value indicative of the oscillation frequency of the pressurized fluid in the vessel. Receiver circuit means is operatively connected to the receiver means for providing a fluid resonating signal having a frequency indicative of the natural frequency of the oscillating pressurized fluid in the fluid bottle. The natural frequency is indicative of the fluid pressure in the fluid bottle. The apparatus further includes drive circuit means operatively connected to the receiver circuit means and to the transducer means for initially driving the transducer means with a square wave energy pulse signal. Subsequently, the drive circuit means drives the transducer means with an oscillating energy wave having a frequency equal to the natural frequency of the pressurized fluid in the fluid bottle. Monitoring means is provided for monitoring the natural frequency of the fluid in the gas bottle and for determining the fluid pressure of the fluid in the fluid bottle in response to the sensed natural frequency. The apparatus further includes means for providing an indication to the vehicle operator if the determined fluid pressure in the fluid bottle is less than a predetermined value.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which.

DESCRIPTION OF PREFERRED EMBODIMENTS

Figure 1:
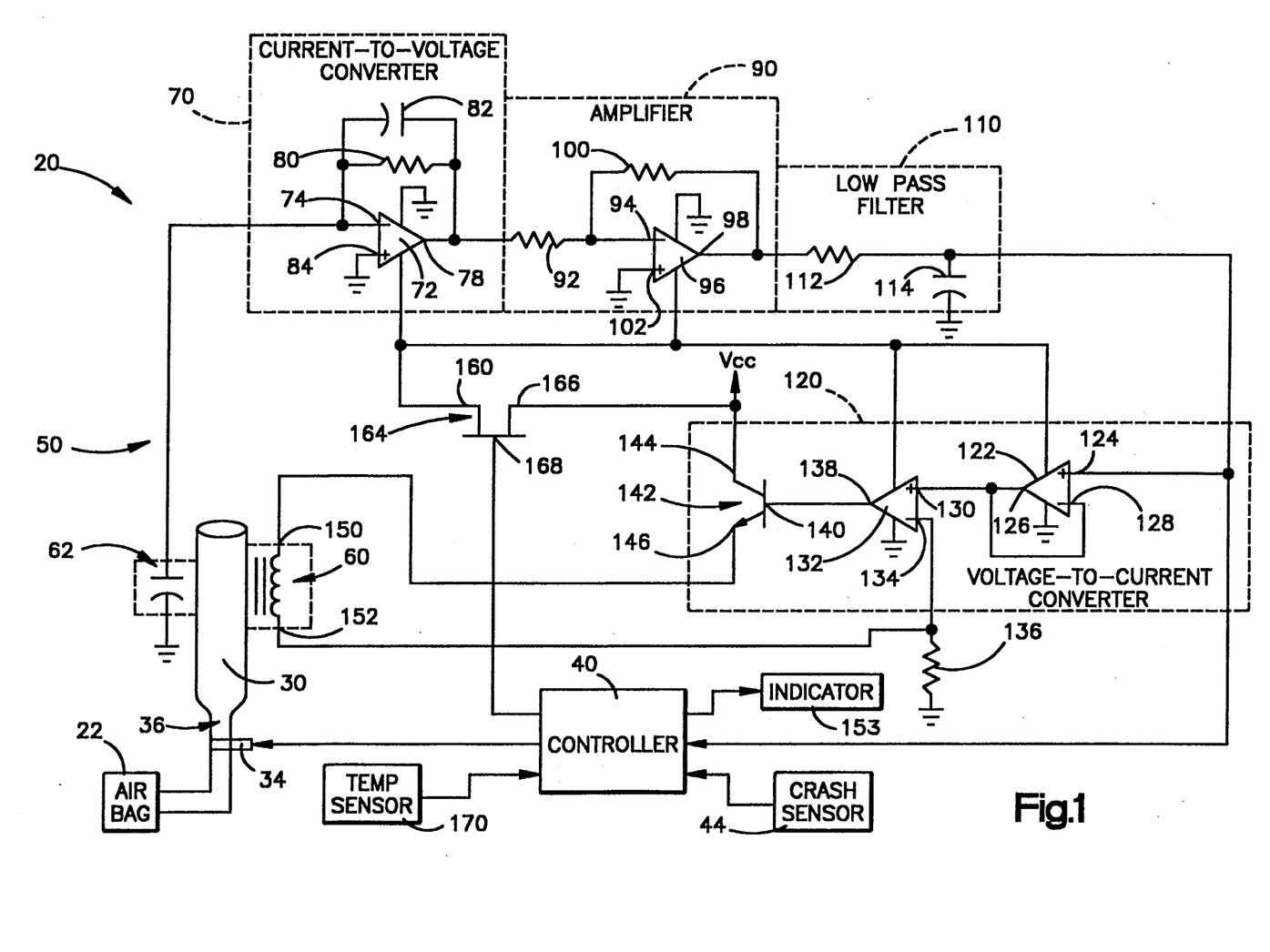
FIG. 1 is a schematic block diagram of an air bag restraint system including a diagnostic arrangement made in accordance with the present invention.

Referring to FIG. 1, an air bag restraint system 20 includes an air bag 22 mounted in an appropriate location such as the steering wheel for the driver or the instrument panel or dashboard for a passenger, so that it will inflate into the vehicle interior compartment. A sealed stiff walled vessel 30 contains pressurized fluid and is connected to the air bag 22. A squib 34 is operatively connected to the sealed opening 36 of the vessel 30. When the squib 34 is ignited, the seal in the opening of the vessel is pierced. When the seal of the vessel is pierced, the pressurized fluid, which may be a gas such as nitrogen or argon, in the vessel 30 passes into and inflates the air bag 22.

The squib 34 is connected to a controller 40 such as a microcomputer. The controller 40 is connected to a vehicle crash sensor 44. The crash sensor 44 can be any of several known types. For example, the crash sensor 44 may be a mechanical inertia switch, such as a rolamite sensor, or an electrical accelerometer. If a normally open mechanical inertia switch is used, the electrical contacts are normally open during a non-crash condition. If a crash condition occurs, the normally open contacts close. Therefore, closure of the switch contacts is indicative of the occurrence of a vehicle crash condition.

If an electrical accelerometer is used as the crash sensor 44, there are several known ways of determining if a crash condition is occurring from the accelerometer output signal. One method is to compare the integrated amplitude of the accelerometer signal against a predetermined value. If the value of the integrated accelerometer signal reaches the predetermined value or remains at or above the predetermined value for a predetermined time, this is an indication that a crash condition is occurring. Once the controller 40 determines that a vehicle crash is occurring for which deployment of the air bag is necessary to protect the vehicle occupants, the controller 40 ignites the squib 34.

A diagnostic circuit 50 is operatively connected to the vessel 30 and to the controller 40. The diagnostic circuit determines the natural frequency of the gas in the vessel 30. The natural frequency of the gas in the vessel is functionally related to the pressure of the gas in the vessel 30.

A speaker 60 is operatively connected to the vessel 30. The speaker is a coil and magnet system that drives a thin flat stainless steel diaphragm. The lines of flux are directed through the center of the coil and pass through the stainless steel diaphragm. The steel diaphragm moves in response to the magnetic field of the coil. The diaphragm thickness is preferably 1 millimeter. The coils are preferably made of 32 awg wire with approximately 250 turns with a DC resistance of 150 Ohms. Energy produced by the speaker 60 is transferred to the pressurized fluid or gas in the vessel 30.

A piezoelectric capacitive sensor 62 is operatively connected to the vessel 30. The sensor 62 picks up the vibrations of the pressurized fluid in the vessel with the charge across the capacitive sensor changing as a function of the detected vibrations. Although polyvinylidine fluoride may be used as a piezoelectric material for the sensor 62, its low mechanical coupling coefficient makes other arrangements more desirable. Preferably, piezoelectric material, such as zinc oxide, is sputtered in a thin film onto a bulk sheet of stainless steel diaphragm material. The sensor electrodes are preferably sputtered alumina. Polyamide is applied as a protective passivation layer.

The sensor 62 is electrically connected to a current-to-voltage converter 70 for the conversion of the electrical current output from the capacitive sensor 62 into a voltage signal. The current-to-voltage converter 70 includes an operational amplifier ("op amp") 72 having its inverting input 74 connected to the sensor 62. The output 78 of op amp 72 is connected to the inverting input 74 through a parallel combination of a feedback resistor 80 and capacitor 82. A non-inverting input 84 of the op amp 72 is connected to electrical ground.

The component values for capacitor 82 and the resistor 80 are selected to give a desired phase shift. Preferably, the values are selected to provide a phase shift of +45 degrees.

The output of the current-to-voltage converter 70 is connected to an amplifier circuit 90. The amplifier circuit 90 includes an serial input resistor 92 that connects the output of the current-to-voltage converter 70 to the inverting input 94 of an op amp 96. The output 98 of the op amp 96 is connected to its inverting input 94 through a feedback resistor 100. The non-inverting input 102 of the op amp 96 is connected to electrical ground. The values of the resistors 92 and 100 are selected so that the gain of the amplifier 90 is greater than one. Because the amplifier 90 provides an inverting gain, the signal from the current-to-voltage converter is phase shifted by 180 degrees by amplifier 90.

The output of the amplifier 90 is connected to a low pass filter 110. The purpose for the low pass filter 110 is to remove harmonics of the pressure resonant or natural frequency of the pressurized fluid as well as frequencies that may be present as a result of vibrations of the vessel 30 itself. Any of several types of low pass filters may be used such as Butterworth, Chebychev, Bessel, or Elliptic. A simple RC filter may be used, as shown in FIG. 1. Such an RC filter includes a resistor 112 and a capacitor 114. The output of the low pass filter 110 is present at the junction of resistor 112 and capacitor 114. The output signal of the low pass filter has a frequency value equal to the natural frequency of the pressurized fluid in the vessel 30, which, in turn, is functionally related to the pressure of the fluid. The low pass filter 110 provides an additional 180 degree phase shift in the signal output from the amplifier 90.

The output of the low pass filter circuit 110 is connected to a voltage-to-current converter 120. The voltage-to-current converter 120 includes a first op amp 122 having its non-inverting input 124 connected to the output of the low pass filter 110. The output 126 of the op amp 122 is connected to its inverting input 128. The output 126 of the op amp 122 is also connected to the noninverting input 130 of an op amp 132. The inverting input 134 of the op amp 132 is connected to electrical ground through a resistor 136. The output 138 of the op amp 132 is controllably connected to the base 140 of a transistor 142. The cathode 144 of the transistor 142 is connected to a voltage source Vcc. The electrode 146 of the transistor 142 is connected to a first terminal 150 of the speaker 60. A second terminal 152 of the speaker 60 is connected to the junction of the resistor 136 and the inverting input 134 of the op amp 132. Because the voltage-to-current converter 120 is non-inverting, there is no phase shift between its input and output. The value of resistor 136 controls the power supplied to the speaker.

The output of the low pass filter 110 is also connected to the controller 40. The controller 40 monitors the frequency of the output signal from the low pass filter 110. The controller 40 also uses an internal look-up table to determine the pressure of the fluid in the vessel 30 from the frequency value. If the pressure falls below a predetermined minimum value at any time during operation of the vehicle, the controller 40 actuates a warning indicator 153 which is mounted in the vehicle interior. The actuated indicator 153 informs the vehicle operator that a problem exists in the air bag system, i.e., the fluid pressure in the vessel 30 is too low.

Each of the op amps 72, 96, 122, and 132 has its associated power connection terminal connected to one terminal 160 of a solid state switching device 164 such as a field-effect-transistor ("FET"). A second terminal 166 of the FET 164 is connected to the voltage source Vcc. The controller 40 is controllably connected to the switch control input 168 of the FET 164. After the vehicle ignition is first started, the controller switches the FET 164 ON, thereby connecting Vcc to each of the op amps 72, 96, 122, and 132. When power is first applied to the op amps, a single square wave pulse is output to the speaker coil 60. Those skilled in the art will appreciate that a square wave comprises the sum of all frequency components. Therefore, all frequency values are present in a single square wave pulse. When the square wave pulse "hits" the vessel, the pressurized gas inside of the vessel will ring at its natural frequency, which is functionally related to the pressure of the fluid.

The circuit loop comprising the sensor 62, the current-to-voltage converter 70, the amplifier 90, the low pass filter 110, the voltage-to-current converter 120, and the speaker 60, which form a phase lock circuit having loop feedback, initially has a phase shift of +45 degrees. If a natural frequency exists in the pressurized fluid when the speaker 60 is initially pulsed with a square wave signal, the natural frequency pulls the loop phase shift down to a value of 0. At resonance, there is a phase shift between the speaker 60 and the receiver 62 of −45 degrees. Once the phase shift of the loop reaches the 0 value, the loop locks on to that frequency because the two conditions of loop oscillation are satisfied, i.e., a phase shift of 0 degrees and a gain greater than one. The natural frequency of the fluid as detected by the loop is monitored at the output from the low pass filter 110. This frequency is, through the feed-back circuit, used to drive the speaker 60 and continues to drive the speaker 60 at the natural frequency for a predetermined time period as determined by controller 40. Those skilled in that art will appreciate that the circuit arrangement may be left on continuously or can operate for a predetermined time after vehicle ignition ON.

The natural frequency of the compressed gas in the vessel 30 is the mechanical equivalent of an electrical oscillation. The only difference between the two is that the mechanical oscillation cannot be sustained at the same amplitude from cycle to cycle due to a finite amount of viscous damping in the system. However, the electrical loop of the present invention amplifies and phase shifts the natural frequency (brings the loop to 0 phase shift), thereby to sustain the oscillations.

Figure 2:
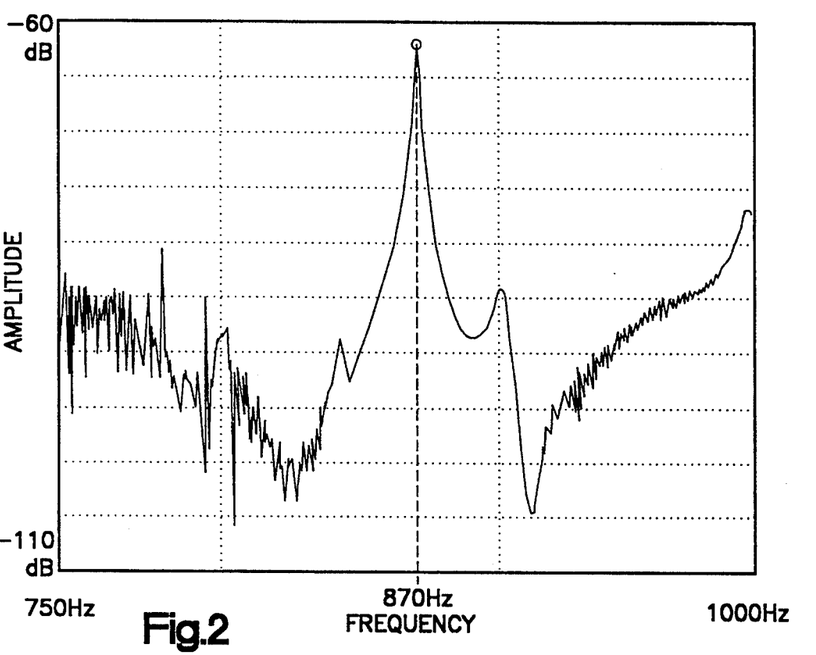
FIG. 2 is a graphical representation of the amplitude output of the monitored oscillations from the vessel shown in FIG. 1 as a function of a sweep frequency applied to the speaker.

A better understanding of the natural frequency of the fluid in the vessel can be appreciated from the graph shown in FIG. 2. In this graph, the magnitude of the signal from the sensor 62 is on the Y-axis and frequency is on the X-axis. To develop this graph, the speaker 60 is driven by an oscillator (not shown) that sweeps through a frequency range from 750 Hz to 1000 Hz. The drive signal for the speaker is a fixed amplitude signal. The graph represents data from a pressurized vessel having an inert noble gas at 2000 PSI. As can be seen from the graph, the magnitude of the oscillations seen by the sensor is greatest at approximately 870 Hz. This translates into a very small damping coefficient at 870 Hz, which means that the natural frequency of the gas is 870 Hz.

If this pressurized vessel was monitored by the control loop of the present invention, the loop would lock onto the 870 Hz frequency. The initial square wave pulse from the speaker has all frequencies present, including 870 Hz. The initial application of the square wave pulse would result in the sensor detecting the oscillation of greatest amplitude, i.e., the 870 Hz frequency. The control loop is designed so as not to saturate electrically, thereby permitting the loop to oscillate at a single sinusoidal frequency due to the extremely high Q of the natural frequency of the gas in the vessel. Also, the loop satisfies the two conditions need for oscillation at the natural frequency of the gas, i.e., a gain greater than one and a zero phase shift.

Figure 3:
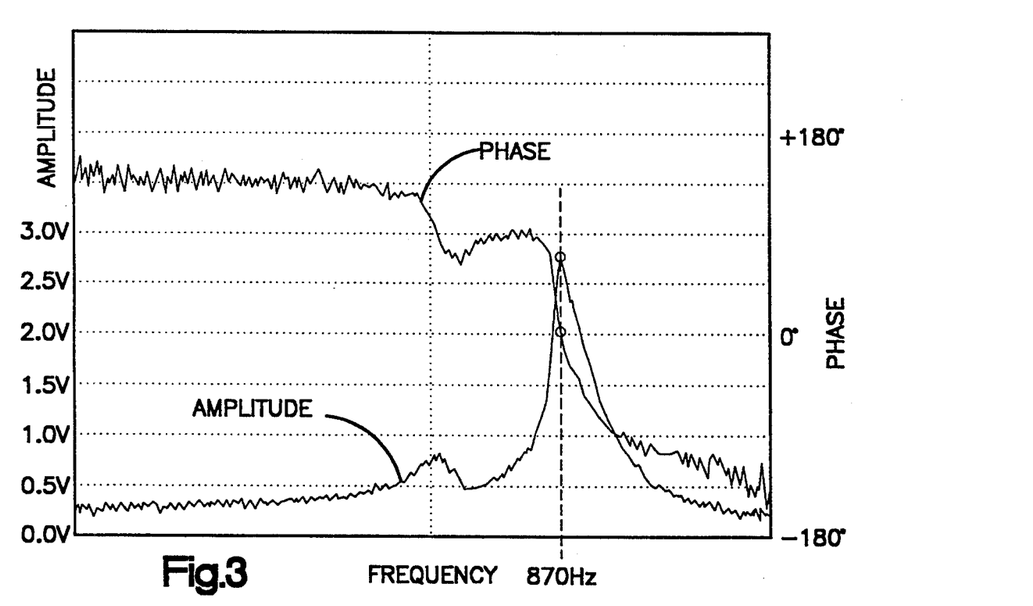
FIG. 3 is an overlaid graphical representation of (i) relative phase versus input frequency and (ii) signal amplitude versus input frequency for the system shown in FIG. 1.

Referring to FIG. 3, a phase versus frequency graph is superimposed upon an amplitude versus frequency graph. Frequency is on the X-axis. The Y-axis has both a phase designation and an amplitude designation. The phase values of the phase graph represents the value of the signal output from the low pass filter 110 divided by the value of the input signal to the speaker 60. The frequency at which the peak amplitude occurs and at which the zero phase occurs is the natural frequency of the pressurized gas in the vessel. Rather than sweeping through a frequency range, "hitting" the vessel with the initial square wave energy pulse which includes all of the frequencies results in the natural frequency being picked up by the sensor 62 and the frequency being locked-on by the circuit loop.

Figure 4:
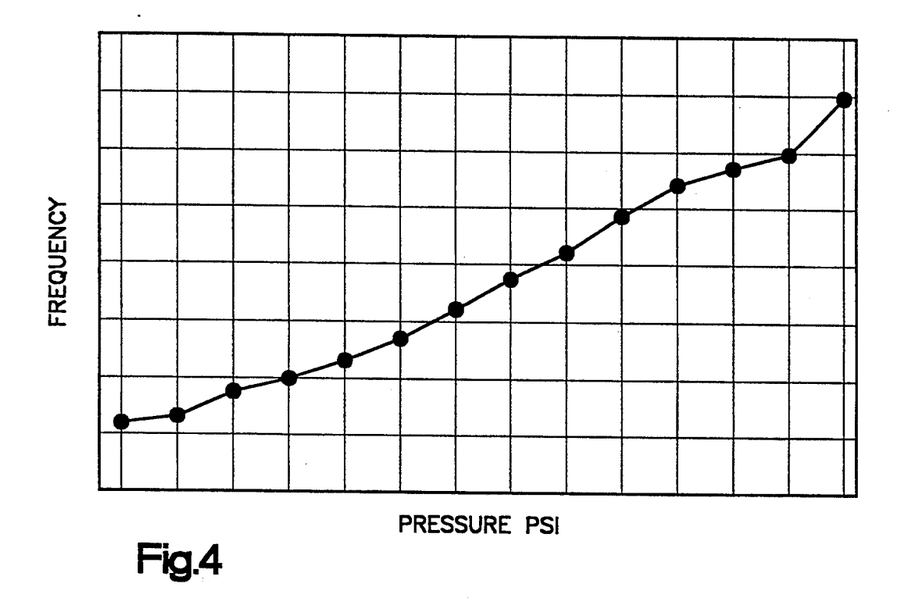
FIG. 4 is a graphical representation of natural frequency versus pressure for the system shown in FIG. 1.

FIG. 4 is a natural frequency versus pressure graph with frequency on the Y-axis and pressure in PSI on the X-axis. This graph shows the functional relationship between frequency and pressure for an inert noble gas.

Figure 5:
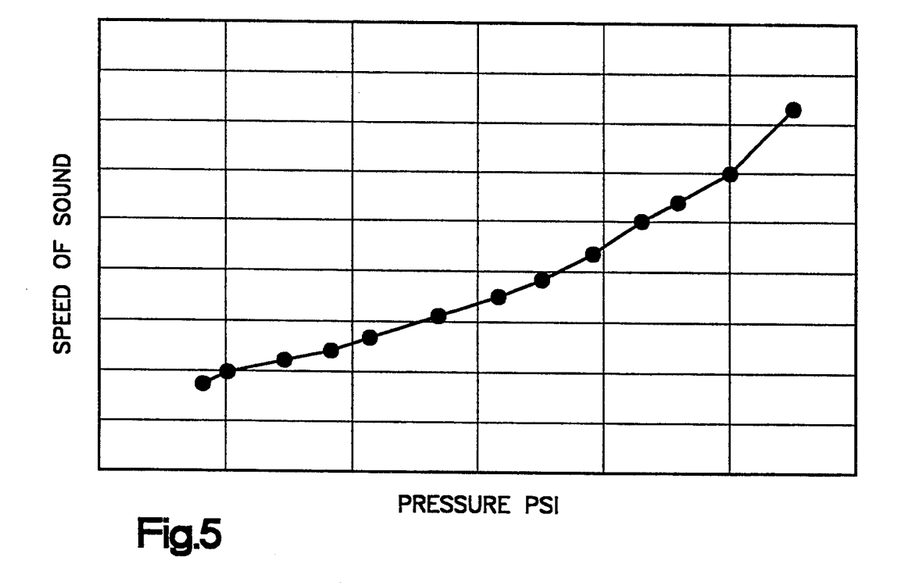
FIG. 5 is a graphical representation of the speed of sound of the fluid versus pressure for the system shown in FIG. 1.

FIG. 5 is a speed of sound in the pressurized fluid versus pressure graph with the speed of sound on the Y-axis and pressure in PSI on the X-axis. This graph is also for an inert noble gas. As can be seen by the graph, the speed of sound in the gas increases as the pressure of the gas increases. The circuit loop of the present invention exploits this phenomena by locking onto the natural frequency of the pressurized gas in the vessel due to the gas resonating in the vessel.

The natural frequency of the gas in the vessel is governed by a second order system assuming lumped parameters. Using a basic spring-mass model, the laws of motion may be expressed as:

$$m \cdot \frac{d^2 \cdot X}{dt^2} + c \cdot \frac{d \cdot X}{dt} + k \cdot X = F(t) \tag{1}$$

where X=displacement of mass, dX/dt=first derivative of mass displacement, $d^2X/dt^2$=second derivative of mass displacement, m=mass, c=damping coefficient, and k=spring constant. By taking the Laplace transform of Equation (1), and introducing the complex frequency term s=Jω, Equation (1) becomes:

$$s^2 + \frac{c}{m} \cdot s + \frac{k}{m} = F(s) \tag{2}$$

The roots of the characteristic equation above are derived via the quadratic formula:

$$s_1 \cdot s_2 = -\frac{c}{2 \cdot m} \pm \sqrt{\left(\frac{c}{2 \cdot m}\right)^2 - \frac{k}{m}} \tag{3}$$

In an attempt to reduce Equation (2) to standard form, the radical of Equation (3), which is the critical damping teem, is set equal to 0:

$$\left(\frac{c}{2 \cdot m}\right)^2 - \frac{k}{m} = 0 \tag{4}$$

By letting the damping coefficient for critical damping be:

$$c_{crit} = 2 \cdot \sqrt{k \cdot m} \tag{5}$$

The damping ratio is defined as:

$$\zeta = \frac{c}{c_{crit}} = \frac{c}{2 \cdot \sqrt{k \cdot m}} \tag{6}$$

The natural frequency is defined as:

$$\omega_n = \sqrt{\frac{k}{m}} \tag{7}$$

The quality factor is defined as:

$$Q = \frac{\omega_n \cdot m}{c} = \frac{1}{2} \cdot \zeta \tag{8}$$

Equation (2) can then be rewritten as:

$$s_1 \cdot s_2 = -\zeta \cdot \omega_n \pm \omega_n \cdot \sqrt{\zeta^2 - 1} \tag{9}$$

Using classical thermodynamics, the physical phenomena of the gas oscillations can be appreciated. The speed of sound in the gas as a function of the gas pressure and the density of the gas can be expressed as:

$$c = \sqrt{\frac{B}{\rho}} \tag{10}$$

where c is the speed of sound in the material, B is the bulk modulus of the material, and p is the density of the material. The propagation of audio frequencies in a gas is an adiabatic process due in part to the inability of the gas to convect heat from compressed zones, i.e., a local increase in temperature, to rarefied zones, i.e., a local decrease in temperature. No heat can be added to nor taken out of the gas due to an audio sound wave propagating through the gas. The speed of sound in the gas of the audio wave is derived from the following equations:

$$B_{adiabatic} = -V \cdot \left(\frac{dP}{dV}\right)_{adiabatic} \tag{11}$$

$$P \cdot V^\gamma = \text{constant} \tag{12}$$

where γ is the ratio of the specific heats of the gas. By differentiating with respect to volume:

$$P \cdot \gamma \cdot V^{(\gamma-1)} + V^\gamma \cdot \left(\frac{dP}{dV}\right)_{adiabatic} = 0 \tag{13}$$

Combining equations (11) and (13) yields:

$$B_{adiabatic} = \gamma \cdot P \quad (14)$$

The speed of sound in an adiabatic gas from equation 10 becomes:

$$c = \sqrt{\frac{B}{\rho}} = \sqrt{\frac{\gamma \cdot P}{\rho}} \quad (15)$$

Now, the speed of sound of a wave in the gas must be related to the measured resonant frequency accounting for the boundary condition due to the vessel wall. The boundary condition of the vessel wall means that the normal component of the gas velocity must vanish at the vessel's inner wall, as well as the gas displacement. This assumption is a microscopic view of the gas acting as a particle. This relationship can be expressed as:

$$k \cdot L = 2\pi \alpha_{1n} \quad (16)$$

where k=wave number=$2\pi f/c$, L=the inside length of the vessel, and $\alpha$=the dimensionless bessel function of order 1 and mode n. The observed natural frequency f can then be expressed as:

$$f = \frac{c \cdot \alpha_{ln}}{L} \quad (17)$$

As will be appreciated by those skilled in the art, the closed loop circuit of the present invention locks on to the natural frequency of the pressurized gas in the vessel due to the speed of sound of the gas resonating within the vessel at the natural frequency.

A temperature sensor 170 is connected to the controller 40. In accordance with the well known "Ideal Gas Law," the pressure of the gas in the vessel 30 increases with an increase in the temperature of the gas. Since the ambient temperature affects the temperature of the gas in the vessel 30, it is necessary to monitor the gas temperature and to adjust the determination of the gas pressure as a function of the sensed temperature. The controller 40 measures the frequency output from the low pass filter 110 and adjusts the measurement based upon the monitored temperature. The temperature sensor 170 can either monitor the ambient temperature or can be secured to the vessel to measure the vessel temperature more accurately. The temperature of the gas is functionally related to the temperature of the vessel which is, in turn, functionally related to the ambient temperature about the vessel.

This invention has been described with reference to preferred embodiments. Modifications and alterations may occur to others upon reading and understanding this specification. It is our intention to include all such modifications and alterations insofar as they come within the scope of the appended claims and the equivalents thereof.

Having fully described the invention, the following is claimed:

1. An apparatus for sensing pressure in a sealed vessel, said apparatus comprising:
   transducer means operatively coupled to said vessel for, when energized, transferring energy to pressurized fluid in said vessel, said transferred energy establishing oscillations of the pressurized fluid in the vessel;
   receiver means operatively coupled to said vessel for providing a received electrical signal having a frequency value indicative of a natural frequency of the pressurized fluid in said vessel;
   receiver circuit means operatively connected to said receiver means for providing a fluid resonating signal having a frequency equal to the natural frequency of the oscillating pressurized fluid in the vessel, the natural frequency being indicative of the fluid pressure in said vessel; and
   drive circuit means operatively connected to said receiver circuit means and to said transducer means for initially driving said transducer means with a square wave energy pulse signal and subsequently driving said transducer means with an oscillating energy wave having a frequency equal to said natural frequency of said pressurized fluid in said vessel.

2. The apparatus of claim 1 wherein said receiver circuit means includes filtering means for filtering said received electrical signal to remove frequency components that result from oscillations of the vessel itself, said fluid resonating signal being output from said filtering means so that the frequency of said fluid resonating signal is due only to the pressurized fluid in the vessel.

3. The apparatus of claim 2 wherein said filtering means includes a low-pass filter.

4. The apparatus of claim 2 wherein said receiver circuit means further includes a capacitive piezoelectric sensor that outputs an electrical current signal.

5. The apparatus of claim 4 wherein said receiver circuit means further includes a current-to-voltage converter circuit connected to said sensor for converting said current signal from said sensor into a voltage signal.

6. The apparatus of claim 4 wherein said filtering means is a low-pass filter.

7. The apparatus of claim 1 further including monitoring means for monitoring the natural frequency of the fluid in said vessel and for determining the fluid pressure of the fluid in the vessel in response to the sensed natural frequency and means for providing an indication if the determined fluid pressure is less than a predetermined value.

8. The apparatus of claim 7 further including a temperature sensing means connected to said monitoring means for providing a signal to said monitoring means indicative of the ambient temperature around said vessel, said monitoring means adjusting the indication of the fluid pressure in said vessel in response to the sensed temperature.

9. The apparatus of claim 1 wherein said transducer means is a speaker.

10. The apparatus of claim 1 wherein said transducer means, said receiver means, said receiver circuit means, and said drive circuit means form a closed control loop, said closed control loop including means for providing a loop gain of greater than one and a phase shift of zero degrees upon the occurrence of a natural frequency of the pressurized fluid so that said closed control loop locks onto said natural frequency.

11. An air bag diagnostic apparatus for use in an air bag restraint system including a crash sensor connected to a controller for providing a signal upon the occurrence of a vehicle crash condition, a pressurized fluid bottle, a squib connected to the fluid bottle and electrically connected to the controller, and an air bag connected to the fluid bottle, the controller actuating the squib upon the occurrence of a crash condition to pierce a seal on the fluid bottle and let the pressurized fluid in the bottle inflate the air bag, the diagnostic apparatus comprising:

transducer means operatively coupled to said fluid bottle for, when energized, transferring energy to pressurized fluid in said fluid bottle, said energy establishing oscillations of the pressurized fluid in the fluid bottle;

receiver means operatively coupled to said fluid bottle for providing a received electrical signal having a frequency value indicative of the oscillation frequency of the pressurized fluid in said fluid bottle;

receiver circuit means operatively connected to said receiver means for providing a fluid resonating signal having a frequency indicative of the natural frequency of the oscillating pressurized fluid in the fluid bottle, the natural frequency being indicative of the fluid pressure in said fluid bottle;

drive circuit means operatively connected to said receiver circuit means and to said transducer means for initially driving said transducer means with a square wave energy pulse signal and subsequently driving said transducer means with an oscillating energy wave having a frequency equal to said natural frequency of said pressurized fluid in said fluid bottle;

monitoring means for monitoring the natural frequency of the fluid in said fluid bottle and determining the fluid pressure of the fluid in the fluid bottle in response to the sensed natural frequency; and means for providing an indication to the vehicle operator if the determined fluid pressure in the fluid bottle is less than a predetermined value.

12. The apparatus of claim 11 further including a temperature sensing means connected to said monitoring means for providing a signal to said monitoring means indicative of the ambient temperature around said vessel, said monitoring means adjusting the indication of the fluid pressure in said fluid bottle in response to the sensed temperature.

13. The apparatus of claim 11 wherein said receiver circuit means includes filtering means for filtering said received electrical signal to remove frequency components that result from oscillations of the fluid bottle itself, said fluid resonating signal being output from said filtering means so that the frequency of said fluid resonating signal is due only to the pressurized fluid in the fluid bottle.

14. The apparatus of claim 13 wherein said filtering means includes a low-pass filter.

15. The apparatus of claim 13 wherein said receiver circuit means further includes a capacitive piezoelectric sensor that outputs an electrical current signal.

16. The apparatus of claim 15 wherein said receiver circuit means further includes a current-to-voltage converter circuit connected to said sensor for converting said current signal from said sensor into a voltage signal.

17. The apparatus of claim 15 wherein said filtering means is a low-pass filter.

18. The apparatus of claim 11 wherein said transducer means is a speaker.

19. The apparatus of claim 11 wherein said transducer means, said receiver means, said receiver circuit means, and said drive circuit means form a closed control loop, said closed control loop including means for providing a loop gain of greater than one and a phase shift of zero degrees upon the occurrence of a natural frequency of the pressurized fluid so that said closed control loop locks onto said natural frequency.

20. An apparatus for sensing pressure in a sealed vessel, said apparatus comprising:

transducer means operatively coupled to said vessel for, when energized, transferring a square wave energy pulse to pressurized fluid in said vessel, said transferred square wave energy pulse establishing oscillations of the pressurized fluid in the vessel including a frequency value equal to the natural frequency of the pressurized fluid;

receiver means operatively coupled to said vessel for providing a received electrical signal having a frequency value indicative of the natural frequency of the pressurized fluid in said vessel; and receiver circuit means operatively connected to said receiver means for providing a fluid resonating signal having a frequency equal to the natural frequency of the oscillating pressurized fluid in the vessel, the natural frequency being indicative of the fluid pressure in said vessel, said receiver circuit means including filtering means connected to said receiver means for removing frequency components from said received electrical signal that result from oscillations of the vessel itself.

21. A method for sensing pressure in a vessel, said method comprising the steps of:

transferring energy to pressurized fluid in the vessel, said transferred energy establishing oscillations of the pressurized fluid in the vessel;

receiving a signal from the vessel having a frequency value indicative of the oscillation frequency of the pressurized fluid in said vessel including the natural frequency of the pressurized fluid in said vessel;

providing a fluid resonating signal having a frequency equal to the natural frequency of the oscillating pressurized fluid in the vessel, the natural frequency being indicative of the fluid pressure in said vessel;

initially providing a square wave energy pulse signal to said vessel; and subsequently providing an oscillating energy wave having a frequency equal to said natural frequency of said pressurized fluid in the vessel.

22. The method of claim 21 further including the step of filtering the received electrical signal to remove frequency components that result from oscillations of the vessel itself so that the frequency of said fluid resonating signal is due only to the pressurized fluid in the vessel.

23. The method of claim 22 wherein said step of filtering includes passing frequency components less than a predetermined value.

24. The method of claim 22 wherein said step of receiving includes providing a capacitive piezoelectric sensor that outputs an electrical current signal.

25. The method of claim 24 wherein said step of receiving further includes providing a current-to-voltage converter circuit connected to said sensor for converting said current signal from said sensor into a voltage signal.

26. The method of claim 24 wherein said step of filtering means includes passing only frequency components having a value less than a predetermined value.

27. A method for determining the functionality of an air bag restraint system including a crash sensor connected to a controller for providing a signal upon the occurrence of a vehicle crash condition, a pressurized fluid bottle, a squib connected to the fluid bottle and electrically connected to the controller, and an air bag connected to the fluid bottle, the controller actuating the squib upon the occurrence of a crash condition to pierce a seal on the fluid bottle and let the pressurized fluid in the bottle inflate the air bag, the method comprising the steps of:

- transferring energy to pressurized fluid in said vessel from a transducer means, said transferred energy establishing oscillations of the pressurized fluid in the fluid bottle;
- providing a received electrical signal having a frequency value indicative of the oscillation frequency of the pressurized fluid in said fluid bottle including the natural frequency of the pressurized fluid in the vessel;
- providing a fluid resonating signal having a frequency equal to of the natural frequency of the oscillating pressurized fluid in the vessel, the natural frequency being indicative of the fluid pressure in said fluid bottle;
- initially providing a square wave energy pulse signal to the fluid bottle;
- subsequently providing an oscillating energy wave to the fluid bottle having a frequency equal to said natural frequency of said pressurized fluid in said fluid bottle;
- monitoring the natural frequency of the fluid in said fluid bottle;
- determining the fluid pressure of the fluid in the fluid bottle in response to the sensed natural frequency; and
- providing an indication to the vehicle operator if the determined fluid pressure in the fluid bottle is less than a predetermined value.

28. The method of claim 27 further including the steps of sensing the ambient temperature around the fluid bottle and adjusting the indication of the fluid pressure in said fluid bottle in response to the sensed temperature.

29. The method of claim 27 further including the step of filtering the received electrical signal to remove frequency components that result from oscillations of the fluid bottle itself so that the frequency of said fluid resonating signal is due only to the pressurized fluid in the fluid bottle.

30. A method for sensing pressure in a vessel, said method comprising the steps of:

- transferring a square wave energy pulse to pressurized fluid in the vessel, said transferred energy establishing oscillations of the pressurized fluid in the vessel including a frequency value equal to the natural frequency of the pressurized fluid;
- receiving a signal from the vessel having a frequency value indicative of the oscillation frequency of the pressurized fluid in said vessel including the natural frequency of the pressurized fluid in said vessel;
- filtering the signal received from the vessel to remove frequency components that result from oscillations of the vessel itself; and
- providing a fluid resonating signal in response to the filtered received signal having a frequency equal to the natural frequency of the oscillating pressurized fluid in the vessel, the natural frequency being indicative of the fluid pressure in said vessel.

* * * * *